(12) United States Patent
Lang et al.

(10) Patent No.: US 7,825,951 B2
(45) Date of Patent: Nov. 2, 2010

(54) LARGE VEHICLE CAMERA ASSEMBLY FOR MONITORING DEAD SPOTS

(75) Inventors: Heinrich Lang, Ergersheim (DE); Stephan Plomp, LH Berkel-Enschot (NL); Peter Fleischer, Nuremberg (DE); Johann Fellner, Dietenhofen (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 1441 days.

(21) Appl. No.: 11/232,557

(22) Filed: Sep. 22, 2005

(65) Prior Publication Data

US 2006/0061656 A1      Mar. 23, 2006

(30) Foreign Application Priority Data

Sep. 22, 2004   (DE)   ................. 20 2004 014 778 U

(51) Int. Cl.
*B60Q 1/00*     (2006.01)
(52) U.S. Cl. .................. 348/148; 348/143; 340/438
(58) Field of Classification Search ............ 348/142, 348/143, 148, 116, 118, 159, 36, 383, 151, 348/222.1; 701/1, 96, 300, 25, 41, 70, 72; 340/438, 425.5, 903, 904, 901, 998, 990, 340/461, 431, 433; 382/104
See application file for complete search history.

(56) References Cited

U.S. PATENT DOCUMENTS

| | | | | |
|---|---|---|---|---|
| 5,289,321 | A * | 2/1994 | Secor | 359/896 |
| 6,476,731 | B1 * | 11/2002 | Miki et al. | 340/937 |
| 7,446,650 | B2 * | 11/2008 | Scholfield et al. | 340/438 |
| 2002/0003571 | A1 * | 1/2002 | Schofield et al. | 348/148 |
| 2002/0045376 | A1 * | 4/2002 | Abe et al. | 439/374 |
| 2002/0113873 | A1 * | 8/2002 | Williams | 348/118 |
| 2003/0133014 | A1 * | 7/2003 | Mendoza | 348/148 |
| 2003/0162312 | A1 * | 8/2003 | Takayama et al. | 438/22 |
| 2004/0145457 | A1 * | 7/2004 | Schofield et al. | 340/425.5 |
| 2004/0148063 | A1 * | 7/2004 | Patchell | 701/1 |
| 2004/0184638 | A1 * | 9/2004 | Nobori et al. | 382/104 |
| 2004/0212686 | A1 * | 10/2004 | Usami | 348/208.99 |
| 2005/0240342 | A1 * | 10/2005 | Ishihara et al. | 701/208 |
| 2005/0285938 | A1 * | 12/2005 | Suzuki et al. | 348/148 |
| 2006/0029255 | A1 * | 2/2006 | Ozaki | 382/104 |

(Continued)

FOREIGN PATENT DOCUMENTS

DE      200 17 064 U1      1/2001

(Continued)

*Primary Examiner*—Jerome Grant, II
(74) *Attorney, Agent, or Firm*—McNair Law Firm, P.A.; Seann P. Lahey

(57) ABSTRACT

A camera assembly for a driver cab of a large vehicle is disclosed for monitoring a front dead angle zone extending in front of and laterally across the driver cab, the camera assembly comprises a display monitor carried within the driver cab; and a camera in communication with the display monitor for monitoring the dead angle zones. A support arm has a first arm and a second arm. The camera is mounted to the first arm of the support arm, and the second arm of the support arm being affixed to the driver cab. An adjustable joint connects the first and second arms so that the first arm may be moved to adjust the viewing position of the camera and the camera may be positioned properly for monitoring the dead angle zone.

19 Claims, 4 Drawing Sheets

U.S. PATENT DOCUMENTS

2006/0176368 A1 * 8/2006 Yang et al. .................. 348/142
2007/0040661 A1 * 2/2007 Takemura et al. ........... 340/461

FOREIGN PATENT DOCUMENTS

| DE | 697 09 810 T2 | 1/2002 |
| DE | 202 04 991 U1 | 10/2002 |
| DE | 699 04 979 T2 | 1/2003 |

* cited by examiner

LARGE VEHICLE CAMERA ASSEMBLY FOR MONITORING DEAD SPOTS

BACKGROUND OF THE INVENTION

The present invention relates to a large vehicle with a driver cab, and particularly to a camera assembly for monitoring dead angle zones in front and laterally of the driver cab, as well as camera assembly suitable for same.

Large vehicles such as trailer trucks, buses and the like, are equipped today with so-called main mirrors that make it possible to see the area behind or laterally behind the large vehicle. To monitor areas in front of and/or laterally in front of the large vehicle [dead angle zone] it is known to install additional so-called front mirrors on the large vehicle, e.g., at the top of the A-sleeper or the A-frame column of the vehicle, enabling the driver to see these areas and to recognize obstacles, children at play, etc. in time to prevent an accident.

Such front mirrors are attached to the vehicle by means of rigid supports fixedly or detachably connected at one end to the vehicle and a mirror head with a mirror pane attached fixedly or detachably on the other end of the support. This is a disadvantage because the front mirror itself impedes forward or lateral vision in part because of its position and size.

Accordingly, an object of the present invention is to propose a large vehicle with a driver cab that is equipped with a device to monitor the dead angle zones laterally and in front of the driver cab which is not an impediment to vision.

Another object of the present invention is to propose a camera assembly that is suitable for monitoring the dead angle zones without impediment of driver vision.

SUMMARY OF THE INVENTION

The above objectives are accomplished according to the present invention by providing a small camera assembly having little or no vision impairment mounted to monitor the dead angle zones and display the zones on a monitor inside the driver cab. The camera may be advantageously mounted to the A-frame column of the large vehicles so that no additional impediment to the vision of the driver occurs. At the same time this placement ensures that the dead angle zone in front of the driver cab, as well as laterally of the driver cab, is effectively surveyed by the camera. In an advantageous embodiment of the invention, the camera assembly monitors the dead angle zone on the passenger side, since the dead angle zone is especially applicable on the passenger side due to the seated position of the drive. In another advantageous embodiment of the invention the camera assembly is mounted at a level higher than the height of an average person so that pedestrians walking past the large vehicle are prevented from striking the camera projecting from the driver cab. In order to ensure this, the height at which it is mounted is at least 2 meters.

In an advantageous embodiment of the invention the camera and the support arm extend horizontally and laterally forward away from the A-frame column to more effectively prevent impediment to vision. Preferably, the camera assembly is carried by a support arm mounted to the front of the driver cab below the windshield by means of a mounting bracket. With this design sufficient flat surface is available for mounting or receiving a mounting bracket and it is not necessary to make an adaption to a possible curve in the A-frame column. In another preferred aspect of the invention the support arm is made of two articulated arms connected to each other by a rotatable adjustment knuckle. This makes optimal positioning of the camera at the end of the support arm possible. The camera is mounted on a remote end of the support arm so that it is also capable of rotation.

In another advantageous aspect of the invention the camera assembly comprises a wide-angle lens in order to ensure complete coverage of the dead angle zone. The support arm of the camera may also serve as the holding arm of a front exterior rear view mirror. In this manner the support arm fulfills a double function.

In another advantageous aspect of the invention a display monitor communicating with the camera is installed in the driver cab in such manner that the driver's viewing direction on the main exterior rear view mirror is approximately the same as viewing direction on the monitor. In this way, the driver's attention when starting up or in shunting, when he is already used to looking at the exterior rear view mirror, is also directed to the monitor.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Referring now in more detail to the drawings, the invention will now be described in more detail.

Figure 1:
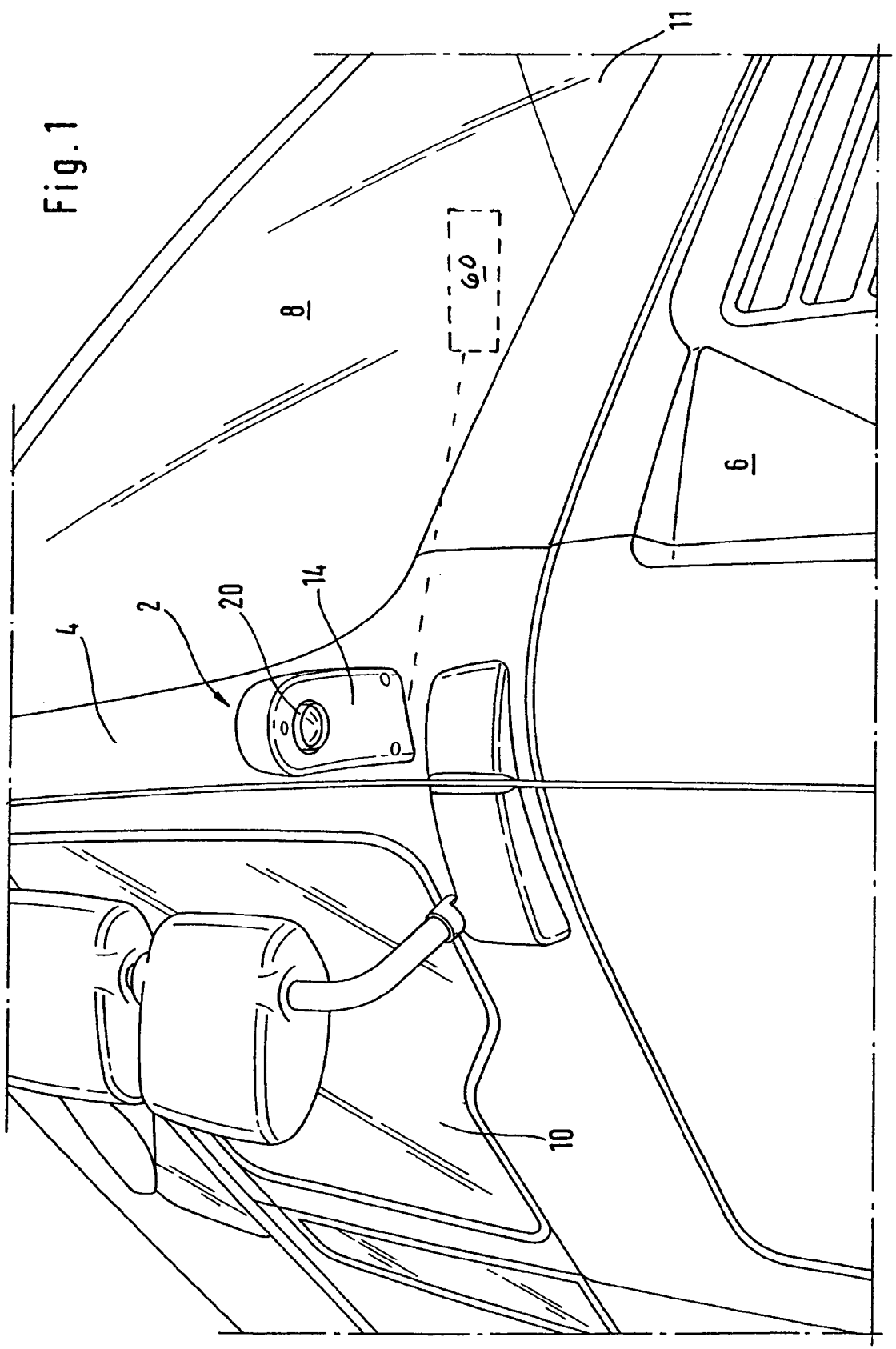
FIG. 1 shows a representation in perspective of a camera assembly with support arm mounted on the A-frame column of a large vehicle.
Figure 2:
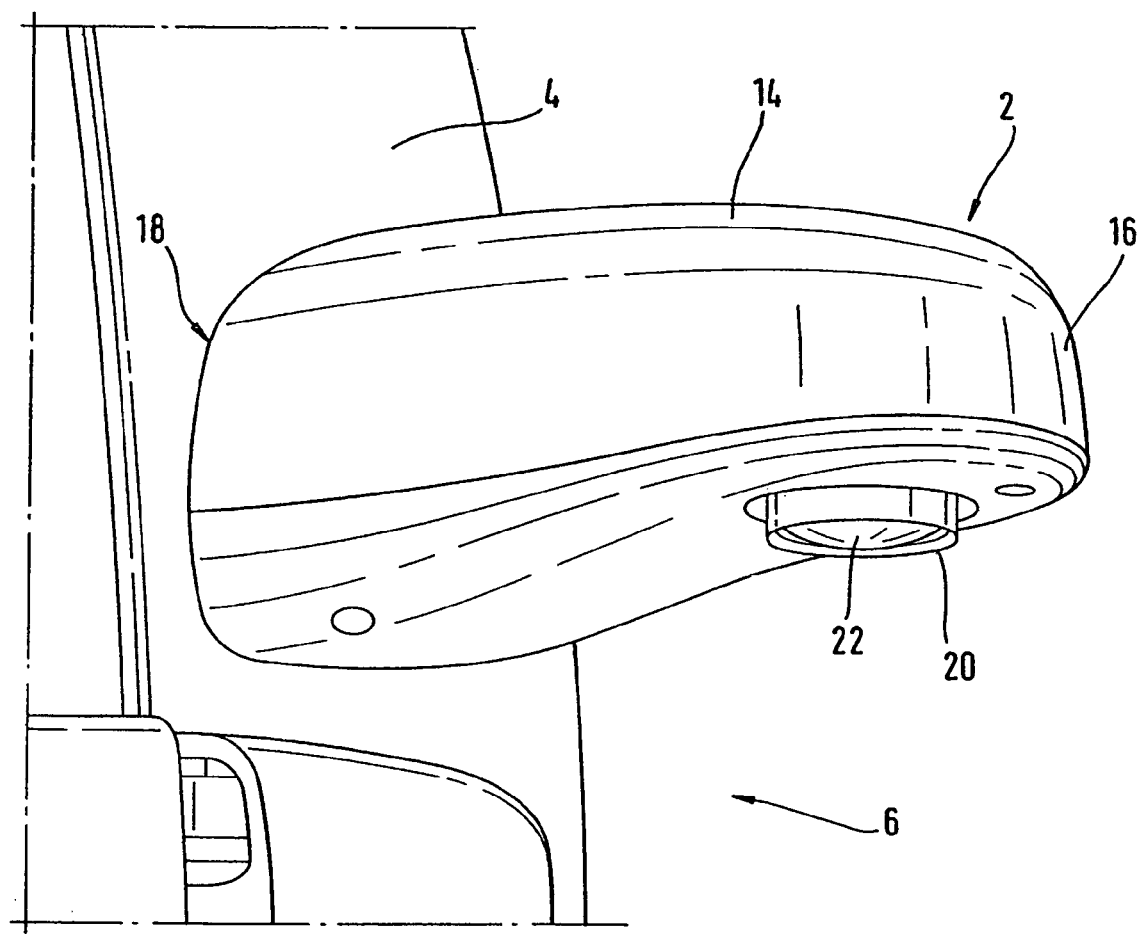
FIG. 2 shows an enlarged detail of the embodiment of FIG. 1.

FIGS. 1 and 2 illustrate a camera assembly 2 mounted on an A-frame column 4 on the passenger side of a driver cab of large vehicles. The driver cab 6 comprises a windshield 8 and left and right-hand lateral windows 10 and 11. The camera assembly 2 comprises a support arm 14 extending horizontally from driver cab 6, with a first free end 16 and a second mounted end 18. A camera 20 with a wide-angle lens 22 is mounted on the underside of the first end 18 of the support arm 14 in picture taking direction. The second end 16 terminates at a mounting bracket attached to A-frame column 4 at the level of the lower edge of windshield 8 on driver cab 6. Support arm 14 is beam-shaped and extends approximately 15 cm horizontally away from driver cab 6. Support arm 14 is installed higher than an average man's height so that pedestrians may not knock against it with their head, for example, at about two meters.

The length of support arm 14 varies from 5 to 20 cm, depending on the design and form of the driver cab 6. A 5 cm support arm is attached directly to the outside of the driver cab 6. This presupposes that the form of the driver cab permits free vision downward even with a very short support arm 14 and that the dead angle zones in front of and laterally next to the driver can can be covered with a camera mounted in this manner directly on the driver cab.

Figure 3:
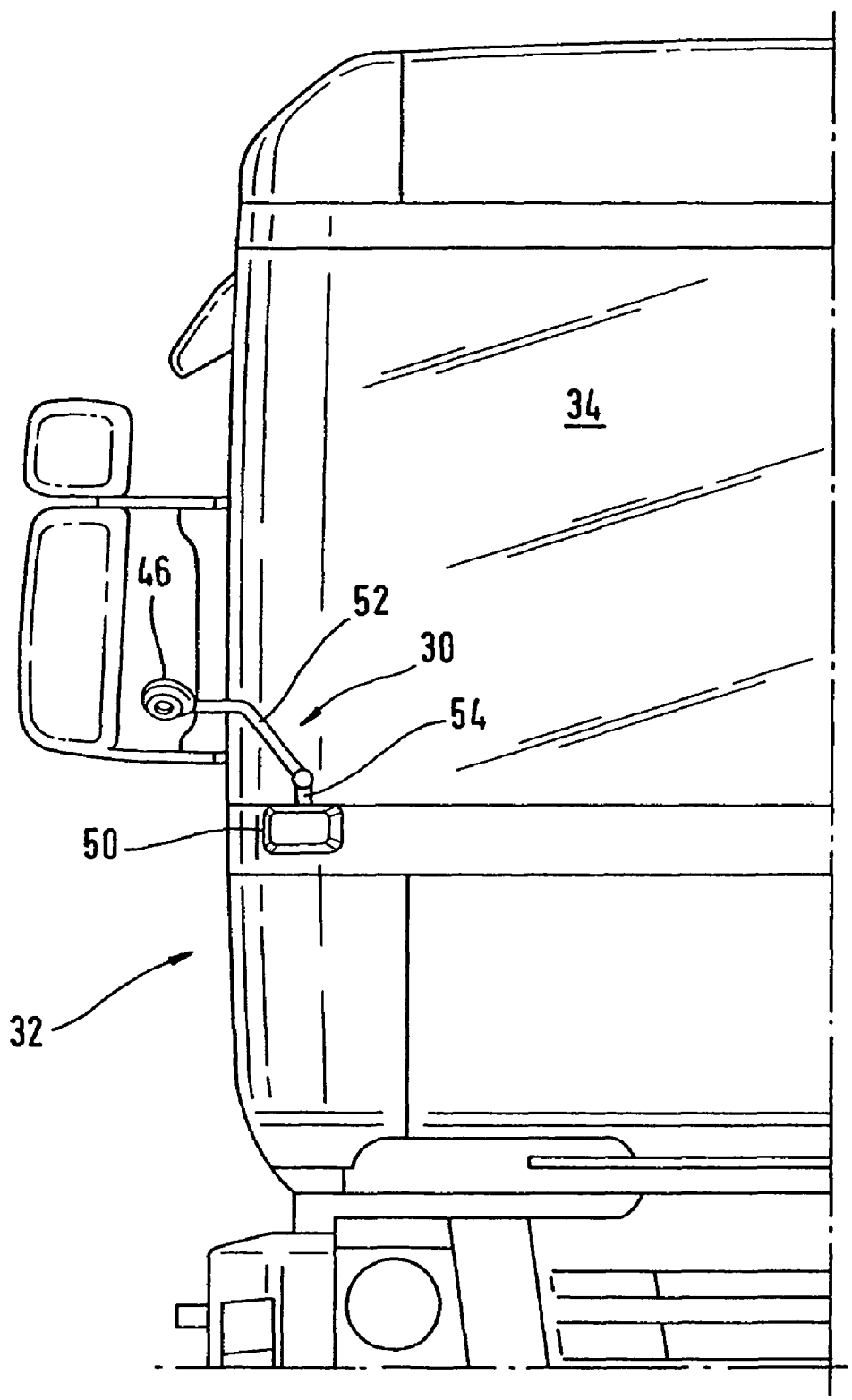
FIG. 3 shows a representation in perspective of a second embodiment of the invention.
Figure 4:
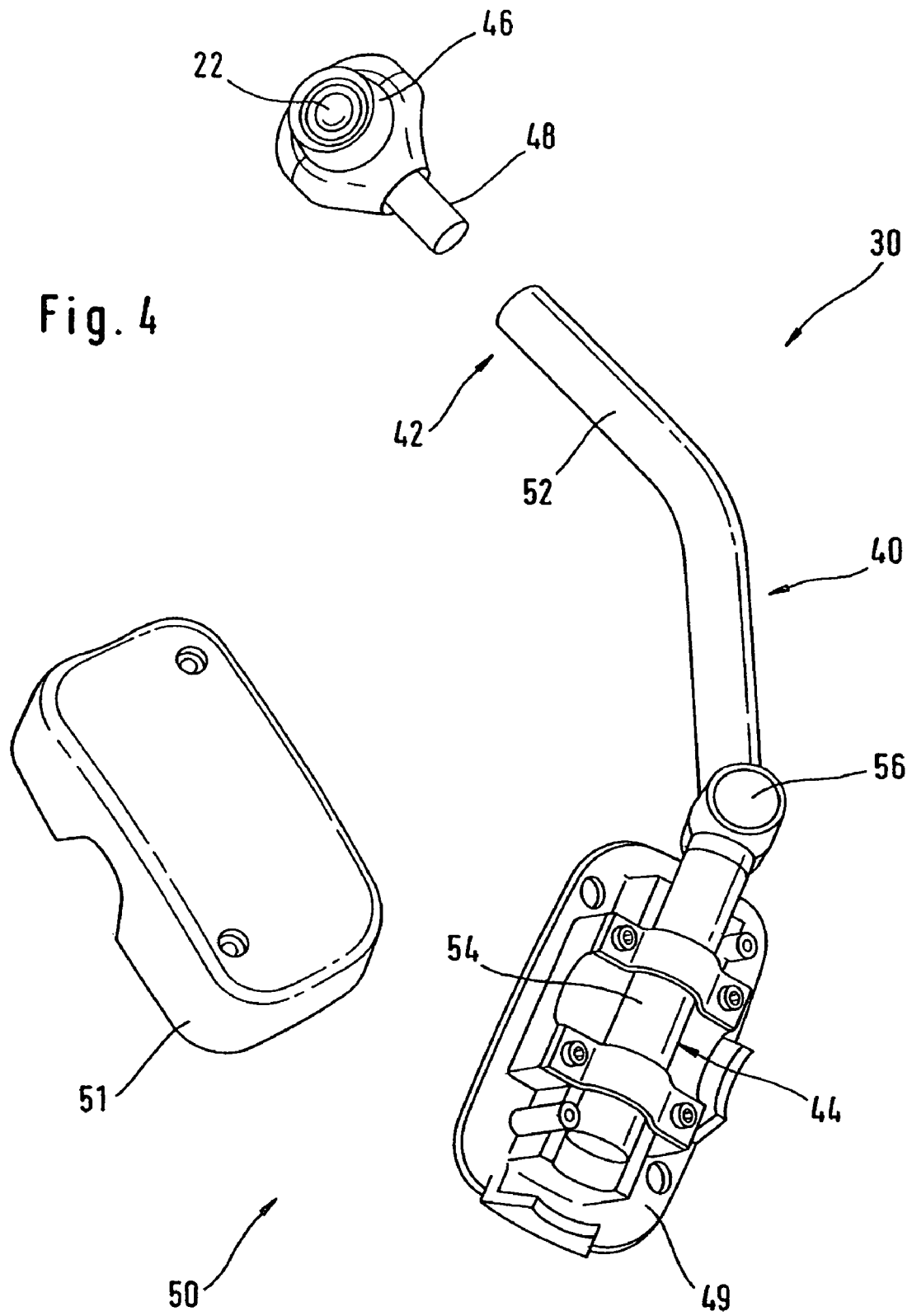
FIG. 4 shows an enlarged detail of the second embodiment.

FIGS. 3 and 4 show a second embodiment of the invention in which a camera assembly 30 is mounted at another location on a driver cab 32. The driver cab 32 also comprises a windshield 34 and a left-hand and a right-hand lateral window (not shown). Driver cab 32 differs from driver cab 6 in, among other things, that the windshield 34 is bent laterally in the direction of the two lateral windows and has therefore a U-shaped cross-section. Part of the left and right forward edge of the driver cab 32 is constituted by the windshield 34 and the A-frame column is shifted laterally in zones of the driver cab 32. Mounting of camera assembly 30 on the A-frame column of the windshield 34 is therefore disadvantageous. For this reason the camera assembly 30 is mounted at the front of driver cab 32, laterally below windshield 34.

Camera assembly 30 comprises a support arm 40 having a first end 42 and a second end 44. A camera 46 is mounted via a pivot bearing 48 on first end 42 of support arm 40. The second end 44 is connected in a detachable manner to a mounting bracket 50. Mounting bracket 50 is mounted under the lower edge of windshield 34, approximately 30 cm from the lateral edge of driver cab 32. Mounting bracket 50 comprises a mounting plate 49 attached to driver cab 32 and a cover 51 which covers mounting bracket 50 with second end 44 of the support arm 40 mounted on it. First end 42 of the support arm provides a first articulated arm 52 and second end 44 provides a second articulating arm 54. First and second articulated arms 52 and 54 are connected to each other via an adjustable rotatable knuckle or joint 56. Second articulated arm 54 is preferably shorter than first articulated arm 52. In addition, first articulated arm 52 is bent. Knuckle 56 and the bearing privot 48 ensure that the camera 46 can be moved into a position in which it surveys the front and from the rear as looking down on driver cab 32 and that camera 46 and support arm 40 can be mounted with the least possible impediment to vision. The total length of support arms 14, 40 is approximately 50 cm from the first to the second end. Depending on the model of the large vehicle and the place of assembly, the total length If the support arms 14, 40 may vary between 20 and 100 cm. Thanks to pivot bearing 48, the rotatable knuckle and mounting element 50, camera assembly 30 is especially well suited for retrofitting existing vehicles.

According to the invention, the image of the dead angle zone recorded by the camera 20, 46 is transmitted to a monitor 60 installed in the driver cab and located within the vehicle driver's field of vision. The signal transmission between camera 20, 46 and the monitor can be wireless or via cable.

While a preferred embodiment of the invention has been described using specific terms, such description is for illustrative purposes only, and it is to be understood that changes and variations may be made without departing from the spirit or scope of the following claims.

What is claimed is:

1. In a large vehicle having a driver cab with a dead angle zone in front and laterally of a driver seated in the driver cab, a camera assembly for monitoring the dead angle zone comprising:
a support arm carried by the driver cab having a first end extending away from the driver cab, and a second end mounted to a portion of the driver cab;
a camera carried by said first end of said support arm in such a manner that the camera monitors a front dead angle zone in front of the cab in a direction across the front of said driver cab;
a display monitor disposed within the driver cab in such a manner that the driver's viewing direction for the monitor and a main exterior rear-view mirror is approximately the same; and,
wherein said camera is constructed and arranged to monitor a front dead angle zone in front and laterally of the driver cab, and said support arm comprises first and second articulated arms connected by means of a rotatable and adjustable knuckle joint so that said camera carried on an end of said first articulated arm may be properly adjusted to monitor said dead angle zone.

2. The vehicle of claim 1 wherein the camera is constructed and arranged to monitor a side dead angle zone on the passenger side of the vehicle in the direction of vehicle travel.

3. The vehicle of claim 1 wherein said camera assembly is mounted at a height sufficient to avoid being struck by a person of average height walking underneath or adjacent said camera assembly.

4. The vehicle of claim 3 wherein said camera assembly is mounted about 2 meters above the ground.

5. The vehicle of claim 1 including a support bracket mounted on an A-frame column of the driver cab, and said second end of said support arm being affixed to said mounting bracket.

6. The vehicle of claim 5 wherein said support arm extends generally horizontal and forward from said A-frame column.

7. The vehicle of claim 6 wherein said support arm has an overall length in a range of about 5 to 100 cm.

8. The vehicle of claim 5 wherein said camera assembly is mounted on the driver cab by means of said mounting bracket affixed at the front of the driver cab generally at a lateral edge of said driver cab under the windshield of the driver cab.

9. The vehicle of claim 8 wherein a distance from a center of the mounting bracket to the lateral outer edge of the driver cab is in a range of about 10 to 50 cm.

10. The vehicle of claim 8 wherein said support arm includes a first articulated arm and a second articulated arm, said first and second articulated arms being connected to each other by means of a rotatable knuckle joint having an adjustable, fixed positions.

11. The vehicle of claim 1 wherein said camera includes a wide angle lens.

12. The vehicle of claim 11 wherein said camera includes an adjustable and rotatable mount connecting said camera to said support arm so that said camera may be adjusted to a desired position for optimum monitoring of said dead angle zones.

13. The vehicle of claim 11 wherein said camera and display monitor are connected by one of a wireless or cable connection.

14. The vehicle of claim 1 wherein said camera support arm also provides a holding arm of an exterior mirror.

15. The vehicle of claim 1 including a pivot bearing carried by said first articulated arm for adjustably attaching a camera head of said camera to said first articulating arm in an adjustable manner.

16. A camera assembly for a driver cab of a large vehicle to monitor a front dead angle zone extending in front of and laterally across the driver cab, said camera assembly comprising:
a display monitor carried within said driver cab;
a camera in communication with said display monitor for monitoring said dead angle zone;
a support arm having a first arm and a second arm;
said camera being mounted to said first arm of said support arm, and said second arm of said support arm being affixed to said driver cab; and
an adjustable joint connecting said first and second arms so that said first arm may be moved to adjust the viewing position of said camera; so that said camera may be positioned properly for monitoring said dead angle zone.

17. The vehicle of claim 16 wherein said camera position by said support arm is mounted to monitor a side dead angle zone on a passenger side of said driver cab in the travel direction of the vehicle whereas said front dead angle zone extends in the front of the driver cab transverse to the direction of travel.

18. The assembly of claim 17 including a mounting bracket for mounting said second arm of said support arm to the driver cab, said mounting bracket being affixed to an A-frame column of the vehicle cab generally below the windshield so that no additional impediment to the vision of the driver is created.

19. In a large vehicle having a driver cab with a dead angle zone in front and laterally of a driver seated in the driver cab, a camera assembly for monitoring the dead angle zone comprising:
   a support arm carried by the driver cab having a first end extending away from the driver cab, and a second end mounted to a portion of the driver cab;
   a camera carried by said first end of said support arm in such a manner that the camera monitors a front dead angle zone in front of the cab in a direction across the front of said driver cab;
   a mounting bracket mounted on an A-frame column of the driver cab, and said second end of said support arm being affixed to said mounting bracket;
   wherein said camera assembly is mounted on the driver cab by means of said mounting bracket affixed at the front of the driver cab generally at a lateral edge of said driver cab under the windshield of the driver cab; and,
   wherein said support arm includes a first articulated arm and a second articulated arm, said first and second articulated arms being connected to each other by means of a rotatable knuckle joint having an adjustable, fixed positions.

* * * * *